June 24, 1952  G. B. ELLIS  2,601,267
PRIMARY ALKALINE CELL
Filed Feb. 10, 1950
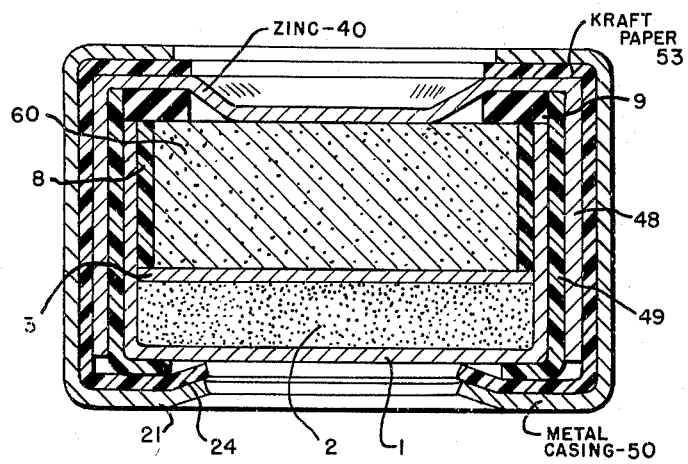
INVENTOR.
GRENVILLE B. ELLIS
BY
Harry M. Saragovitz
Attorney Patented June 24, 1952

2,601,267

UNITED STATES PATENT OFFICE 2,601,267

PRIMARY ALKALINE CELL

Grenville B. Ellis, Red Bank, N. J., assignor to the United States of America as represented by the Secretary of the Army Application February 10, 1950, Serial No. 143,492

1 Claim. (Cl. 136—107)

(Granted under the act of March 3, 1883, as amended April 30, 1928; 370 O. G. 757)

The invention described herein may be manufactured and used by or for the Government for governmental purposes, without the payment of any royalty thereon.

This invention relates to hermetically sealed primary alkaline dry cells of the zinc-potassium hydroxide-mercuric oxide type and more particularly to so-called "button" structures of such alkaline dry cells.

Considerable difficulties with such button cells have been encountered in the hermetic closure structure which is to provide maximum electrical and chemical insulation over a sufficiently long storage period. Recent development has led to hermetically sealed alkaline dry cells in which the generation of gas within the cell, both on open and closed circuits, has been reduced to such an extent that only traces of gas are being formed which can slowly diffuse out thru or past the resilient sealing means without impairing the cell. Nevertheless, a relatively high percentage of battery failures still occurs, usually after prolonged storage periods, particularly at elevated temperatures, due to the occasional formation of greater amounts of gas and building up of dangerous pressure leading to bulging of the cell container, leakage and creepage of electrolyte and subsequent quick corrosion of the cell.

It is an object of this invention to improve the hermetic closure structure of such button type cells by providing a metallic casing which is insulated from the cell by a layer of insulating, absorbent and alkali resistant material and which incloses the cell in such a way as to greatly improve the storage reliability without impairing the electrical characteristics and ease of manufacturing technique of such cells.

Other objects will become apparent from the following description and claim, taken in connection with the accompanying drawings of a preferred embodiment of the invention in its application to known alkaline dry cells comprising essentially an assembly of an open top steel container, a depolarizing cathode in the bottom thereof, a barrier over said cathode, an anode structure on top of said barrier, an immobilized alkaline electrolyte, a conductive metal cover for said container serving as anode terminal, a sealing ring of insulating resilient material between said metal cover and the free edge of said open top steel container, and sealing and clamping means holding said assembly under tight pressure.

The drawing illustrates a flat type bottom cell which consists of an open top steel container or can 1, the bottom of which incloses a depolarizing cathode 2 consisting in known manner of an electronically conductive mass of oxygen yielding compounds, such as oxide of silver or mercury, mixed with carbon or graphite. The cathode 2 is separated in known manner by an ionically permeable barrier disc 3 from the anode which consists of a pellet 60 of porous pressed zinc powder. A sleeve 8 of polystyrene, lining the side walls of the steel can 1, insulates the anode 60 from the steel can 1. The conductive metal cover 40 has a depressed central portion which presses against and is in intimate electrical contact with the upper surface of the zinc pellet. A sealing ring 9 of insulating resilient material (e. g., a neoprene washer) is provided between cover 40 and the free edge of the open top steel can 1. The cover 40 which serves as anode terminal may be made of zinc or may consist of an inner layer of zinc, silver, or other metals resistant to alkalies, and an outer layer of steel.

The conductive metal cover 40, which closes the open top steel container 1, forms the bottom of a cylindrical zinc can 48, the side walls of which are insulated from the walls of the steel container 1 by a layer 49 of insulating material. The entire assembly is hermetically sealed and kept under tight pressure by a metal casing 50 insulated from the steel container 1 by a layer 53 of insulating, absorbent and alkali resistant material. The free end portions 21 and 24 of casing 50 and insulating layer 53 constitute the sealing and clamping means which hold the entire assembly under tight pressure from all directions.

In addition to the advantages already mentioned, the closure structure of the present invention also protects the dry cell from outside shocks, blows, or pressure, and supports the assembly both radially and axially. Alkaline dry cells provided with the improved closure structure have therefore not only a very high storage reliability, but are also mechanically more rigid and less liable to damage in handling and shipping. These advantages are attained with little costs and without interfering with conventional manufacturing techniques.

I claim:

In a hermetically sealed primary alkaline dry cell of the zinc-mercuric oxide type comprising an assembly of an open top steel container, a depolarizing cathode in the bottom thereof, a barrier over said cathode, an anode on top of said barrier, an immobilized alkaline electrolyte, a metal cover for said container serving as anode terminal and a sealing ring of insulating, resilient material between said metal cover and the free edge of said open top steel container; said metal cover constituting the bottom of a cylindrical can, the walls of said can surrounding the walls of said steel container and extending downwardly towards the bottom of said steel container; said walls of said can being insulated from the walls of said steel container by layers of insulating, absorbent and alkaline resistant material; a cylindrically formed metallic casing laterally inclosing the cell, the walls of this metallic casing being insulated from all the metal parts of the cell by a layer of insulating, absorbent and alkaline resistant material; the free edges of said casing constituting sealing and clamping means holding said assembly under tight pressure.

GRENVILLE B. ELLIS.

REFERENCES CITED

The following references are of record in the file of this patent:

UNITED STATES PATENTS

| Number | Name | Date |
|---|---|---|
| 2,198,423 | Anthony | Apr. 23, 1940 |
| 2,332,456 | McEachron et al. | Oct. 19, 1943 |
| 2,422,045 | Ruben | June 10, 1947 |
| 2,482,514 | Ruben | Sept. 20, 1949 |